US011996657B2

(12) United States Patent
Matsuda et al.

(10) Patent No.: US 11,996,657 B2
(45) Date of Patent: May 28, 2024

(54) CONNECTOR INCLUDING MALE AND FEMALE CONNECTORS

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Hidekazu Matsuda, Mie (JP); Kazuki Hiramatsu, Mie (JP); Taiga Kadoyama, Mie (JP); Masanao Yamashita, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 17 days.

(21) Appl. No.: 17/868,158

(22) Filed: Jul. 19, 2022

(65) Prior Publication Data

US 2023/0035192 A1    Feb. 2, 2023

(30) Foreign Application Priority Data

Jul. 27, 2021 (JP) ................................ 2021-122067

(51) Int. Cl.
*H01R 13/6591* (2011.01)
*H01R 13/424* (2006.01)

(52) U.S. Cl.
CPC ..... *H01R 13/65915* (2020.08); *H01R 13/424* (2013.01)

(58) Field of Classification Search
CPC ........ H01R 13/65915; H01R 13/65918; H01R 13/6582; H01R 13/424
See application file for complete search history.

(56) References Cited

U.S. PATENT DOCUMENTS

2017/0201034 A1  7/2017 Hikosaka
2019/0288456 A1* 9/2019 Maesoba .............. H01R 13/424
2019/0319389 A1* 10/2019 Hara .................... H01R 13/516

FOREIGN PATENT DOCUMENTS

JP 2021-028870 A 2/2021

* cited by examiner

*Primary Examiner* — Renee S Luebke
*Assistant Examiner* — Paul D Baillargeon
(74) *Attorney, Agent, or Firm* — Venjuris, P.C.

(57) ABSTRACT

The first connector includes a first inner conductor, a first outer conductor, a first outer conductor cover and a first dielectric. The second connector includes a second inner conductor, a second outer conductor, a second outer conductor cover and a second dielectric. The second outer conductor includes a second outer conductor connecting portion overlapping the first outer conductor in a radial direction. The first outer conductor includes a first outer conductor body portion, a first outer conductor connecting portion for covering the outer periphery of the second outer conductor connecting portion and contacting the second outer conductor connecting portion, and a constricted portion reduced in dimensions from the first outer conductor connecting portion to the first outer conductor body portion. The first outer conductor cover and the second outer conductor cover have the same shape.

3 Claims, 11 Drawing Sheets

CONNECTOR INCLUDING MALE AND FEMALE CONNECTORS

CROSS-REFERENCE TO RELATED APPLICATIONS

This application is based on and claims priority from Japanese Patent Application No. 2021-122067, filed on Jul. 27, 2021, with the Japan Patent Office, the disclosure of which is incorporated herein in its entirety by reference.

TECHNICAL FIELD

The present disclosure relates to a connector.

BACKGROUND

Japanese Patent Laid-open Publication No. 2021-028870 discloses a female connector and a male connector connectable to each other. The female connector includes a female inner conductor, a female dielectric for accommodating the female inner conductor and a female outer conductor for covering the female dielectric. The male connector includes an inner conductor, a dielectric for accommodating the inner conductor and a male outer conductor for covering the dielectric. When the female connector and the male connector are connected, the female inner conductor and the inner conductor are connected to each other and the female outer conductor and the male outer conductor are connected to each other while radially overlapping each other. A technique on connectors is also known from Japanese Patent Laid-open Publication No. 2017-126551.

SUMMARY

Since a shield connector generally has a large number of components, cost tends to increase.

Accordingly, the present disclosure aims to provide a connector capable of suppressing a cost increase by commonly using components.

The present disclosure is directed to a connector, comprising a first connector and a second connector connectable to each other, wherein the first connector includes a first inner conductor, a first outer conductor for covering an outer periphery of the first inner conductor, a first outer conductor cover for covering an outer periphery of the first outer conductor and a first dielectric arranged between the first inner conductor and the first outer conductor, the second connector includes a second inner conductor, a second outer conductor for covering an outer periphery of the second inner conductor, a second outer conductor cover for covering an outer periphery of the second outer conductor and a second dielectric arranged between the second inner conductor and the second outer conductor, the second outer conductor includes a second outer conductor body portion arranged between the second dielectric and the second outer conductor cover and a second outer conductor connecting portion overlapping the first outer conductor in a radial direction, the first outer conductor includes a first outer conductor body portion arranged between the first dielectric and the second outer conductor cover, a first outer conductor connecting portion for covering the outer periphery of the second outer conductor connecting portion and contacting the second outer conductor connecting portion, and a constricted portion reduced in dimensions from the first outer conductor connecting portion to the first outer conductor body portion, and the first outer conductor cover and the second outer conductor cover have the same shape.

According to the present disclosure, it is possible to provide a connector capable of suppressing a cost increase by commonly using components.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
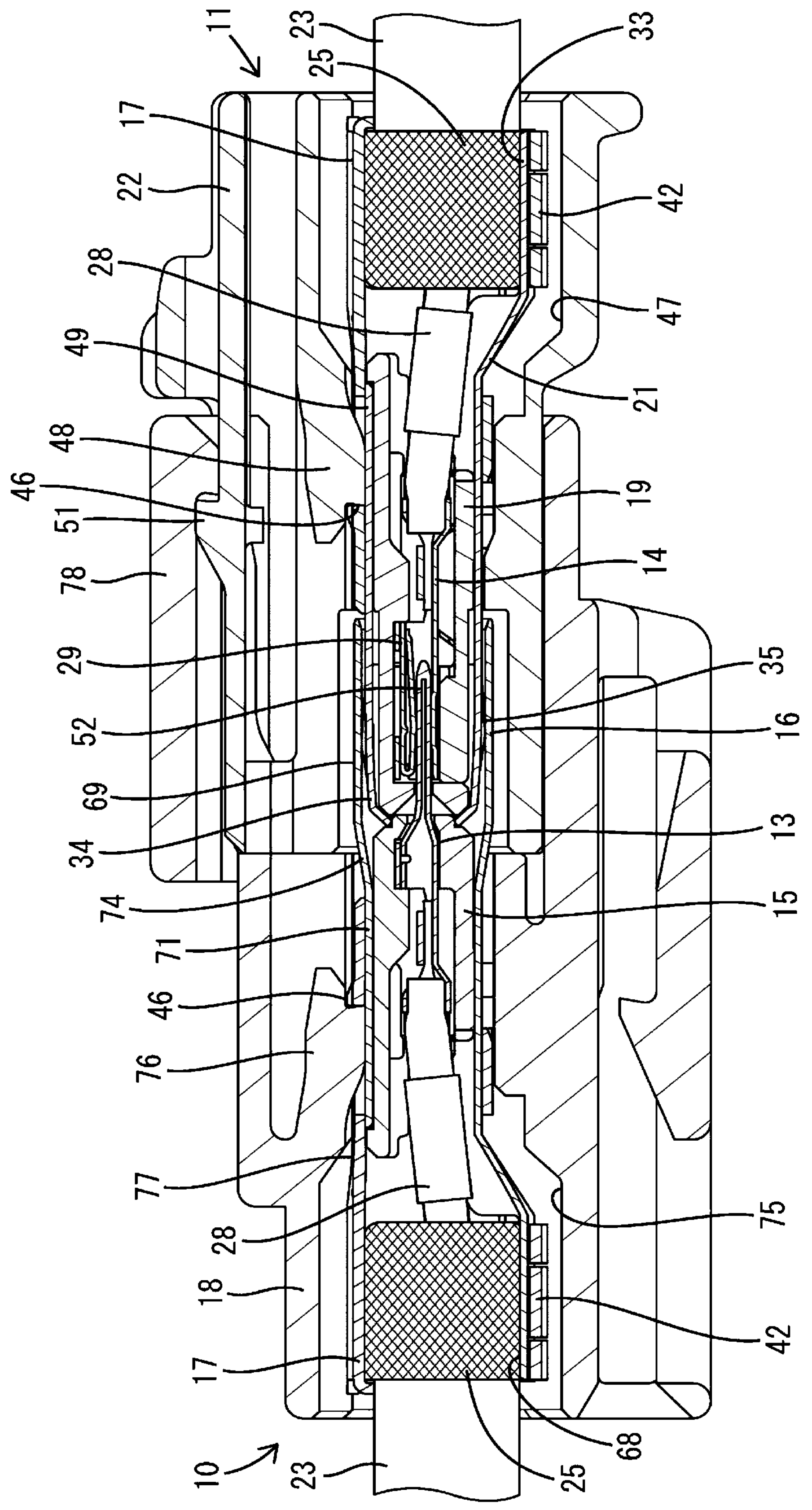
FIG. 1 is a side view in section of a connector of an embodiment showing a state where a first connector and a second connector are connected to each other.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Description of Embodiments of Present Disclosure

First, embodiments of the present disclosure are listed and described.

(1) The connector of the present disclosure is provided with a first connector and a second connector connectable to each other, wherein the first connector includes a first inner conductor, a first outer conductor for covering an outer periphery of the first inner conductor, a first outer conductor cover for covering an outer periphery of the first outer conductor and a first dielectric arranged between the first inner conductor and the first outer conductor, the second connector includes a second inner conductor, a second outer conductor for covering an outer periphery of the second inner conductor, a second outer conductor cover for covering an outer periphery of the second outer conductor and a second dielectric arranged between the second inner conductor and the second outer conductor, the second outer conductor includes a second outer conductor body portion arranged between the second dielectric and the second outer conductor cover and a second outer conductor connecting portion overlapping the first outer conductor in a radial direction, the first outer conductor includes a first outer conductor body portion arranged between the first dielectric and the second outer conductor cover, a first outer conductor connecting portion for covering the outer periphery of the second outer conductor connecting portion and contacting the second outer conductor connecting portion, and a constricted portion reduced in dimensions from the first outer conductor connecting portion to the first outer conductor body portion, and the first outer conductor cover and the second outer conductor cover have the same shape.

As just described, if the first and second outer conductor covers have the same shape, the first and second outer conductor covers can be commonly used between the first connector and the second connector, and cost can be reduced. Particularly, in the case of the above configuration, the first and second outer conductor body portions can be set to have the same or nearly the same dimensions by arranging the constricted portion between the first outer conductor connecting portion and the first outer conductor body portion. Thus, the first and second outer conductor covers can be easily set to have the same shape.

(2) The first dielectric may include a one-side dielectric and an other-side dielectric unitable with each other, the one-side dielectric may include a base wall, facing surfaces intersecting the base wall and facing each other, and a cavity formed between the facing surfaces facing each other to accommodate the first inner conductor, the other-side dielectric may close an opening side facing the base wall, and press-fit projections to be brought into contact with the first inner conductor may be formed on the facing surfaces of the one-side dielectric.

If the first and second outer conductor covers are commonly used between the first connector and the second connector, it becomes difficult to secure a sufficient length for the first dielectric due to an arrangement relationship of the first and second outer conductor covers at the time of connection. As a result, there is a concern that the first inner conductor is not stably accommodated in the cavity of the one-side dielectric. In that respect, according to the above configuration, the first inner conductor can be stably accommodated in the cavity since the press-fit projections formed on the facing surfaces contact the first inner conductor.

(3) The press-fit projections may be in the form of ribs linearly extending from the opening side toward the base wall on the facing surfaces.

If the press-fit projections are formed in this way, the first inner conductor can be easily inserted into the cavity by being lowered from the opening side toward the base wall.

(4) The first inner conductor may be a male terminal and include a terminal body in the form of a rectangular tube to be accommodated into the cavity and a tab projecting from the terminal body and to be arranged outside the one-side dielectric.

If the first inner conductor is a male terminal, the first inner conductor may be lowered from the opening side toward the base wall and the terminal body may be inserted into the cavity. Thus, a concern for the scaping of resin of the dielectric by the tab can be removed. As a result, the adhesion of the resin to the tab can be avoided and the connection reliability of the tab to the second inner conductor can be ensured.

Details of Embodiment of Present Disclosure

Embodiment

A specific example of an embodiment of the present disclosure is described below with reference to the drawings. Note that the present invention is not limited to these illustrations and is intended to be represented by claims and include all changes in the scope of claims and in the meaning and scope of equivalents.

A connector of this embodiment is illustrated as a shield connector connected to an end of a cable 23, in which a communication signal is transmitted. As shown in FIG. 1, the connector is provided with a first connector 10 and a second connector 11 connectable to each other. The first connector 10 is a male connector and includes first inner conductors 13 as male terminals. The second connector 11 is a female connector and includes second inner conductors 14 as female terminals.

Besides the first inner conductors 13, the first connector 10 includes a first dielectric 15, a first outer conductor 16, a first outer conductor cover 17 and a first housing 18. Similarly, the second connector 11 includes a second dielectric 19, a second outer conductor 21, a second outer conductor cover 17 and a second housing 22 besides the second inner conductors 14. Note that since the first outer conductor cover 17 and the second outer conductor cover 17 have the same shape and are commonly usable as described later, these covers are denoted by a common reference sign 17. Further, in the following description, surface sides facing each other when the connection of the first connector 10 and the second connector 11 is started are referred to as front sides concerning a front-rear direction. A vertical direction is based on a vertical direction in each figure except FIGS. 8 and 9.

Figure 2:
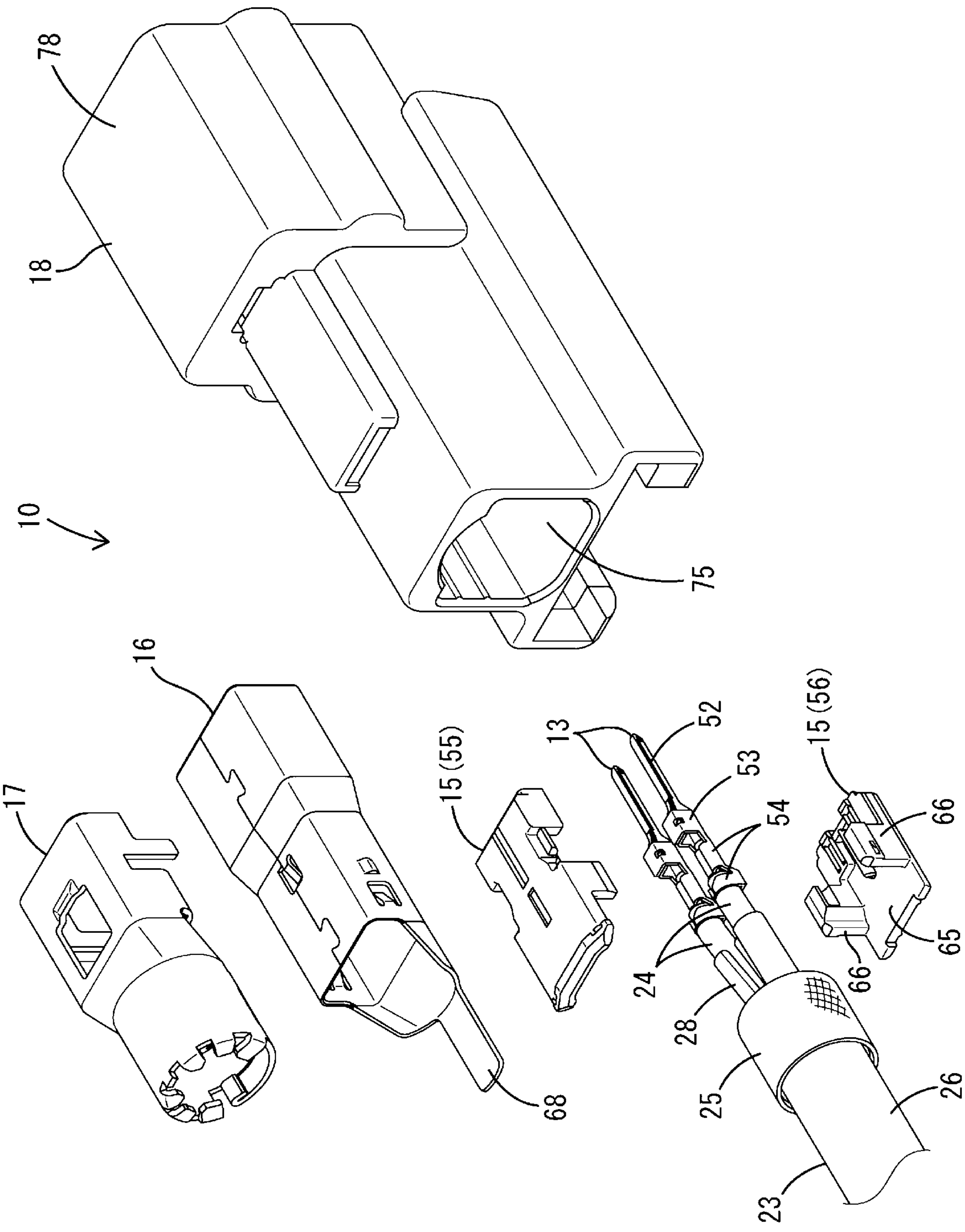
FIG. 2 is an exploded perspective view of the first connector.
Figure 3:
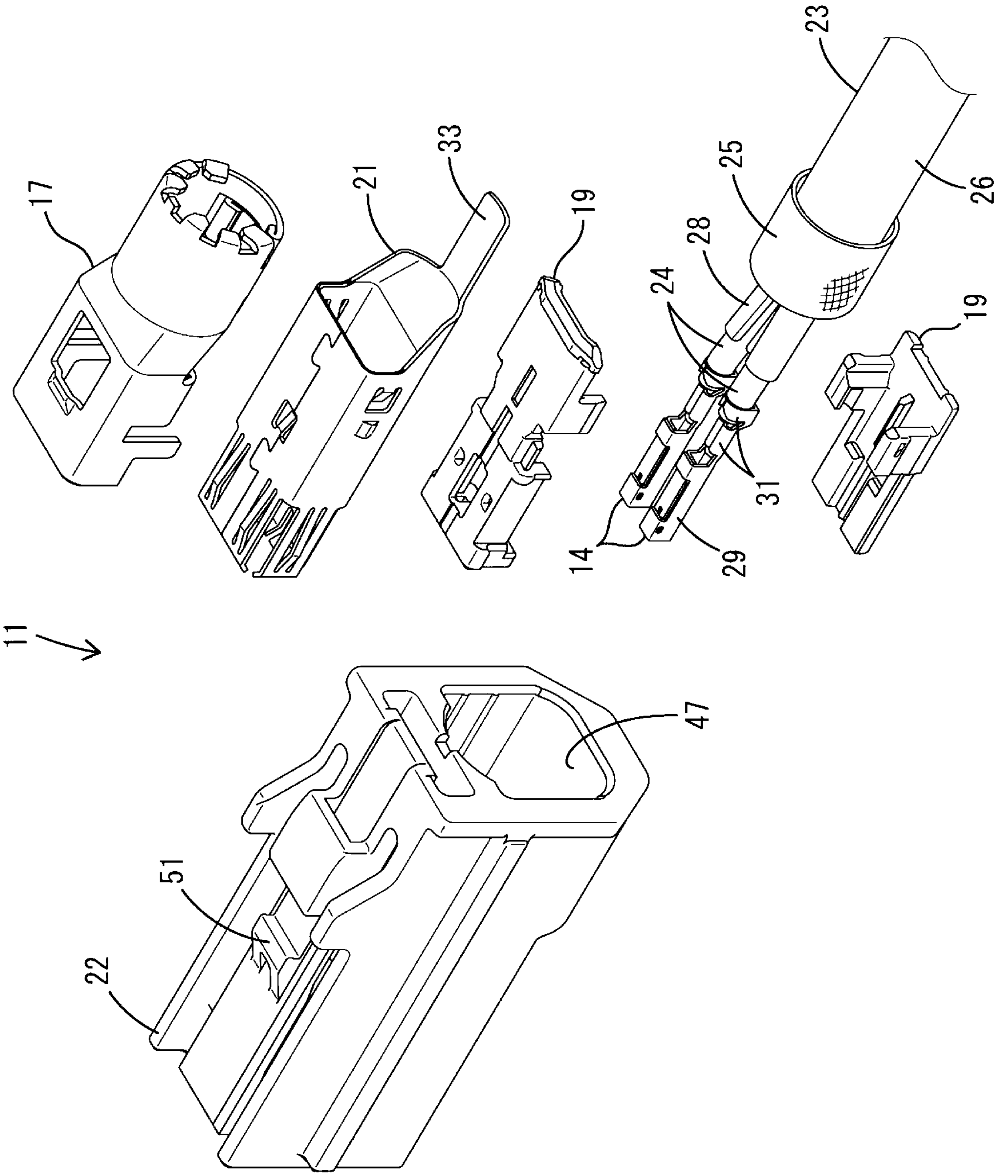
FIG. 3 is an exploded perspective view of the second connector.

As shown in FIGS. 2 and 3, the cable 23 includes two coated wires 24 (twisted pair cable), a shield body 25 such as a braided wire for collectively covering the outer peripheries of the wires 24 and an insulating sheath 26 for covering the outer periphery of the shield body 25. The sheath 26 and the shield body 25 are removed and the two wires 24 are arranged in an exposed manner in a front end part of the cable 23. The shield body 25 exposed from an end of the sheath 26 is folded on a front end part of the sheath 26 behind the exposed parts of the wires 24 in the cable 23. The two wires 24 exposed from the end of the sheath 26 are held by a clip 28 (see FIG. 9). Note that the cables 23 having the same diameter are connected to the first connector 10 and the second connector 11.

<Second Inner Conductors>

The second inner conductor 14 is formed, such as by bending an electrically conductive metal plate. As shown in FIG. 3, the second inner conductor 14 includes a terminal connecting portion 29 in the form of a rectangular tube and a second wire connecting portion 31 connected behind the terminal connecting portion 29. As shown in FIG. 1, the terminal connecting portion 29 contacts and is electrically connected to a later-described tab 52 of the first inner conductor 13 when the first connector 10 and the second connector 11 are connected. The second wire connecting portion 31 is crimped and electrically connected to a core wire in a front end part of the wire 24 and crimped and mechanically connected to a coating of the wire 24. Two second inner conductors 14 are provided to correspond to the two coated wires in the second connector 11.

<Second Dielectric>

The second dielectric 19 is formed of an insulating synthetic resin material into a rectangular parallelepiped shape long in the front-rear direction. Although not shown in detail, the second dielectric 19 is formed by assembling two members with each other in the vertical direction. The two second inner conductors 14 connected to the wires 24 are accommodated side by side in a width direction inside the second dielectric 19.

<Second Outer Conductor>

Figure 4:
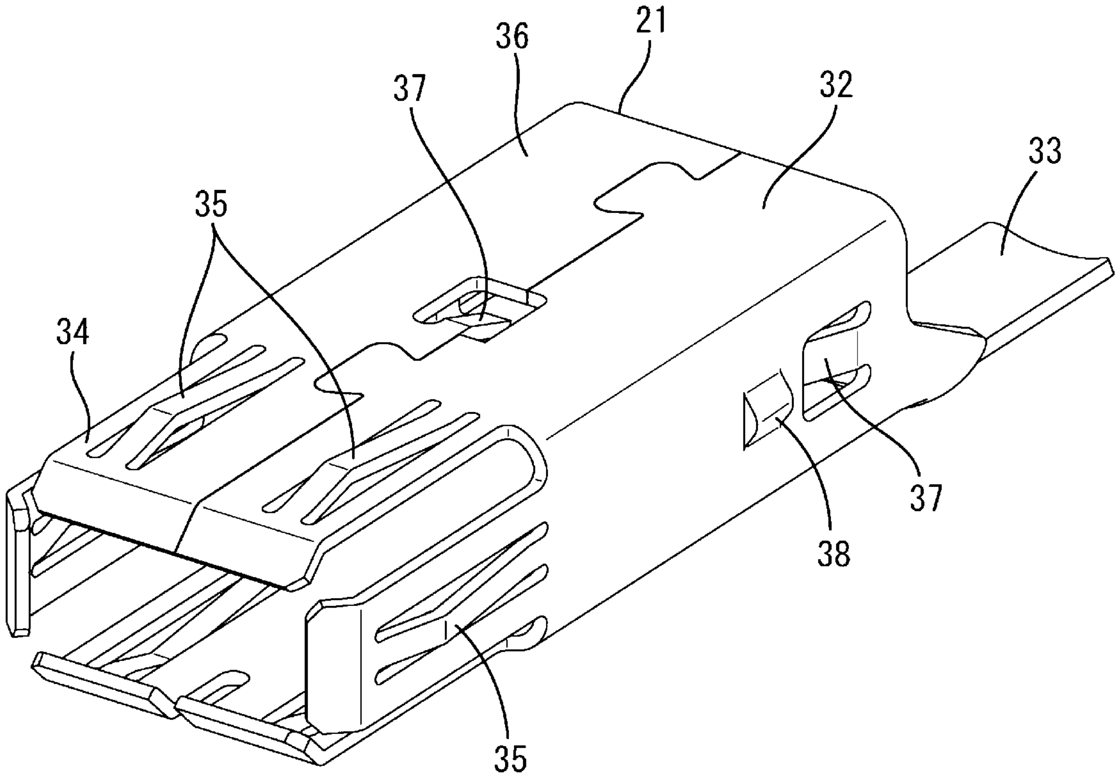
FIG. 4 is a perspective view of a second outer conductor.

The second outer conductor 21 is formed, such as by bending an electrically conductive metal plate. As shown in FIG. 4, the second outer conductor 21 includes a fitting tube portion 32 in the form of a rectangular tube long in the front-rear direction and a second shield connecting portion 33 to be connected to the shield body 25 of the cable 23.

The second dielectric 19 is inserted and accommodated into the fitting tube portion 32 from behind. If the second dielectric 19 is accommodated into the fitting tube portion 32, the second inner conductors 14 are electrically insulated from the fitting tube portion 32 by the second dielectric 19. A second outer conductor connecting portion 34 to be overlapped with the mating first outer conductor 16 in a radial direction is formed in a front end part of the fitting tube portion 32 (see FIG. 1). The second outer conductor connecting portion 34 is formed with resiliently deformable resilient contact portions 35 to be brought into contact with the first outer conductor 16. The resilient contact portions 35 are formed in four walls of the fitting tube portion 32 by cutting and raising.

The fitting tube portion 32 includes a second outer conductor body portion 36 covered by the second outer conductor cover 17 behind the second outer conductor connecting portion 34. The second outer conductor body portion 36 is connected behind the second outer conductor connecting portion 34 without any step while having the same dimensions. Further, the second outer conductor body portion 36 includes a second dielectric locking portion 37 for locking the second dielectric 19 and second cover locking portions 38 for locking the second outer conductor cover 17.

The second shield connecting portion 33 is in the form of a plate extending rearward from the lower edge of the rear end of the fitting tube portion 32. As shown in FIG. 1, the second shield connecting portion 33 is arranged below the shield body 25 and connected to the shield body 25 by receiving a crimping force of the second outer conductor cover 17.

<Second Outer Conductor Cover>

Figure 5:
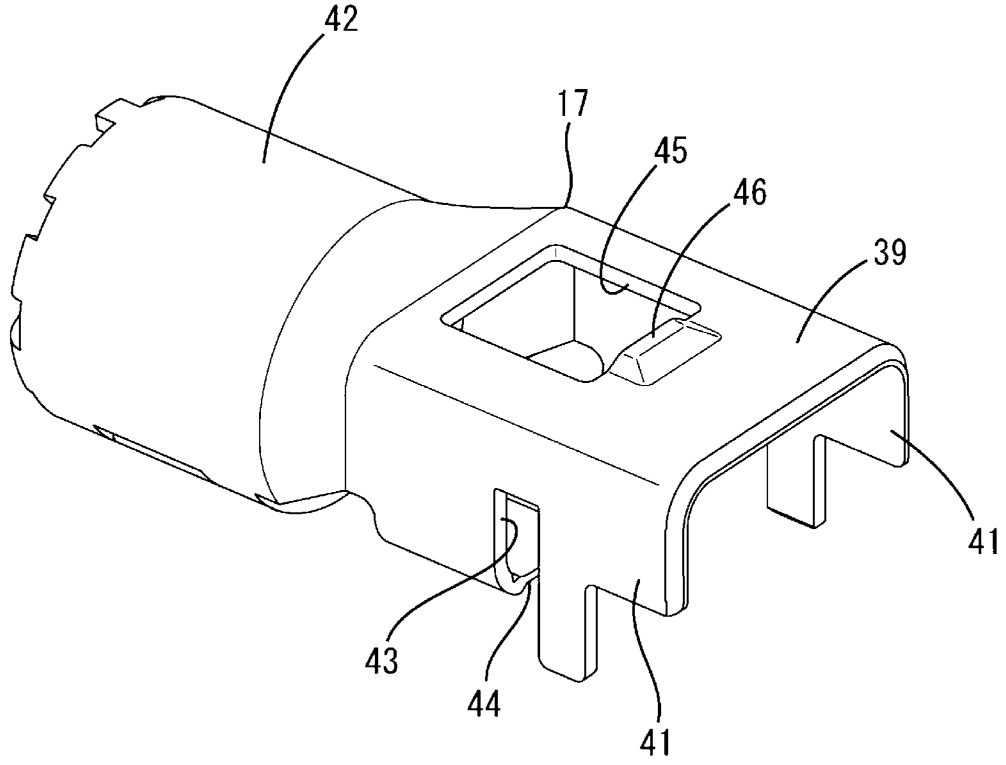
FIG. 5 is a perspective view of a second outer conductor cover, which is also a first outer conductor cover.

The second outer conductor cover 17 is formed, such as by bending an electrically conductive metal plate. As shown in FIG. 5, the second outer conductor cover 17 includes a ceiling plate portion 39 in the form of a flat plate, a pair of side plate portions 41 projecting downward from both widthwise ends of the ceiling plate portion 39 and a shield barrel portion 42 arranged behind the ceiling plate portion 39 and each side plate portion 41. Note that the shield barrel portion 42 shown in FIGS. 2, 3 and 5 is in a deformed form by being crimped to the shield body 25 of the cable 23 for the sake of convenience. To be precise, the shield barrel portion 42 is in the form of an open barrel before deformation. Each side plate portion 41 is formed with a locking groove 43, into which the second cover locking portion 38 is fit. Further, the second outer conductor cover 17 includes a pair of facing plate portions 44 (only one is shown in FIG. 5) projecting inward in the width direction from the lower ends of rear parts of the respective side plate portions 41.

Figure 11:
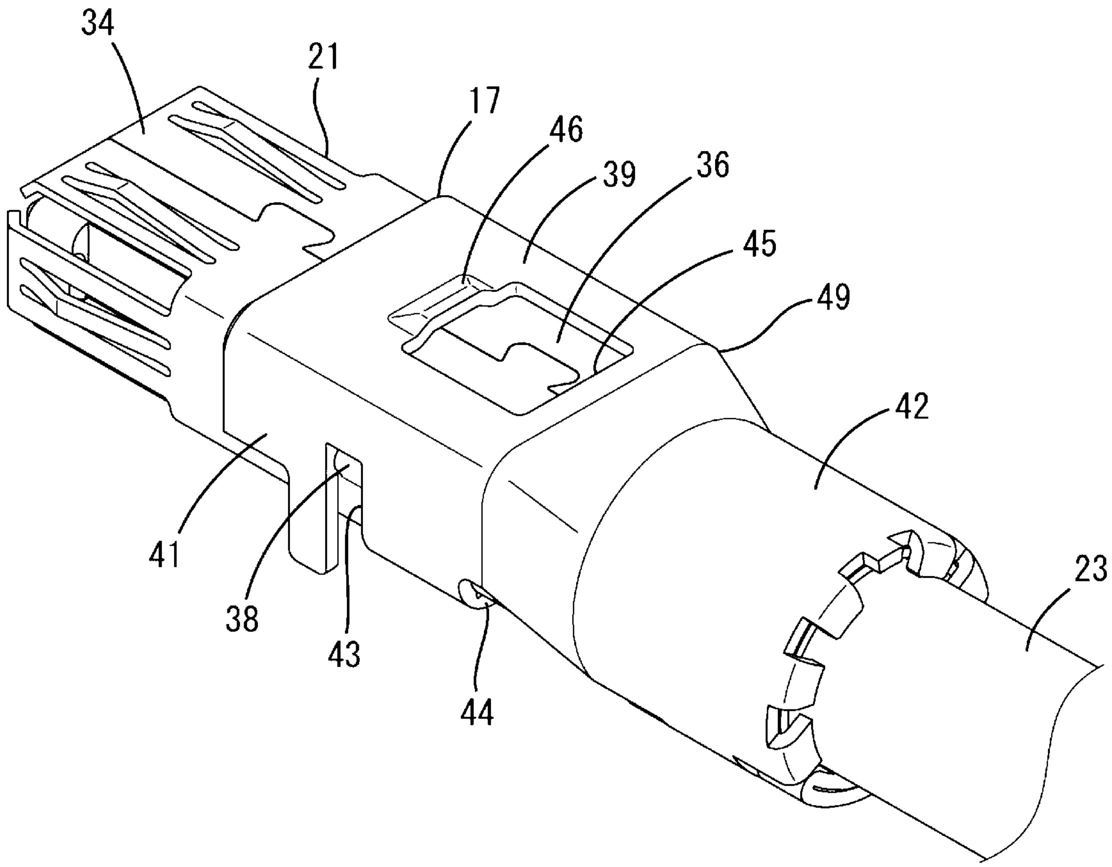
FIG. 11 is a perspective view of a second module.

The second outer conductor body portion 36 is positioned and held by the second outer conductor cover 17 by being arranged inside the ceiling plate portion 39, the respective side plate portions 41 and the respective facing plate portions 44 and locking the second cover locking portions 38 into the locking grooves 43 (see FIG. 11). The ceiling plate portion 39 is formed with a rectangular opening hole 45 and a housing locking projection 46 bent and raised on the front edge of the opening hole 45.

Although not shown, the shield barrel portion 42 is crimped and fixed to the shield body 25 and the cable 23 by engaging projections and recesses on end edges with the shield body 25 arranged inside. The second shield connecting portion 33 is arranged to be sandwiched between the shield barrel portion 42 and the shield body 25 (see FIG. 1).

<Second Housing >

The second housing 22 is made of synthetic resin and includes, as shown in FIG. 1, a second module accommodating portion 47 penetrating in the front-rear direction. A second locking lance 48 is formed to project forward on the upper surface of the inner wall of a rear part of the second module accommodating portion 47. The second locking lance 48 is resiliently deformable in the vertical direction.

A second module 49 formed by assembling the second inner conductors 14, the second dielectric 19, the second outer conductor 21 and the second outer conductor cover 17 is accommodated into the second module accommodating portion 47. If the second module 49 is accommodated into the second module accommodating portion 47, the second locking lance 48 is locked to the locking projection 46 while being fit into the opening hole 45. The upper wall of the second housing 22 is formed with a lock arm 51 capable of locking the first housing 18.

<First Inner Conductors>

The first inner conductor 13 is formed, such as by bending an electrically conductive metal plate. As shown in FIG. 2, the first inner conductor 13 includes the pin-like tab 52, a terminal body 53 in the form of a rectangular tube connected behind the tab 52 and a first wire connecting portion 54 connected behind the terminal body 53. The tab 52 is inserted in and connected to the terminal connecting portion 29 of the second inner conductor 14 in the connected state. The first wire connecting portion 54 is crimped and electrically connected to a core wire in a front end part of the wire 24 and crimped and mechanically connected to a coating of the wire 24. Two first inner conductors 13 are provided to correspond to the two coated wires in the first connector 11.

<First Dielectric>

The first dielectric 15 is formed of an insulating synthetic resin material into a rectangular parallelepiped shape long in the front-rear direction. Radial dimensions (height, width) of the first dielectric 15 are set equal to those of the second dielectric 19.

Figure 7:
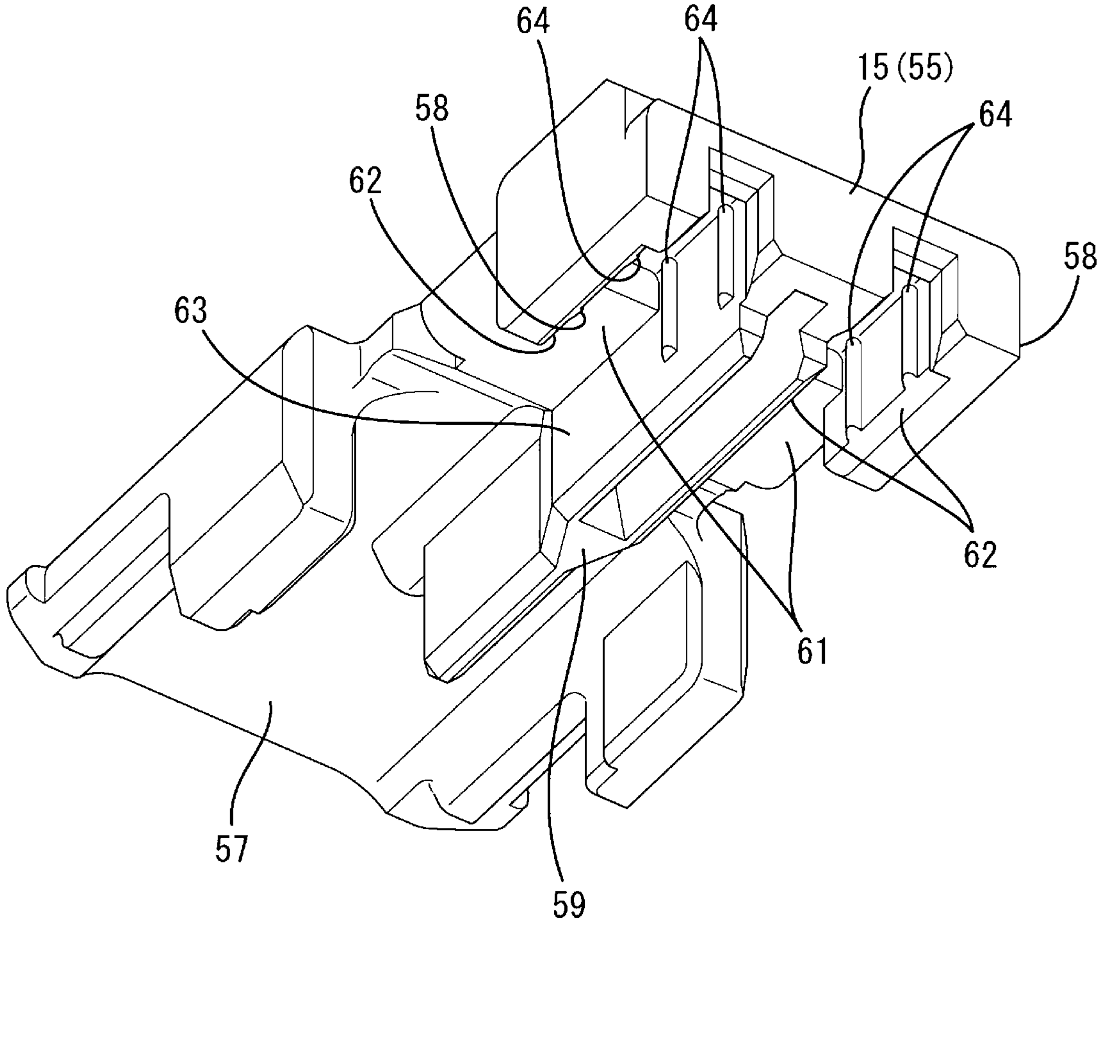
FIG. 7 is a perspective view of a one-side dielectric.

As shown in FIG. 2, the first dielectric 15 includes a one-side dielectric 55 and an other-side dielectric 56 which can be united in the vertical direction. The one-side dielectric 55 is arranged above the other-side dielectric 56. As shown in FIG. 7, the one-side dielectric 55 includes a base wall 57 in the form of a flat plate, a pair of side walls 58 projecting downward from both widthwise ends of the base wall 57 and an interpolar wall 59 projecting downward from the base wall 57 between the pair of side walls 58.

The one-side dielectric 55 includes a pair of cavities 61 in the width direction partitioned by the interpolar wall 59 between the pair of side walls 58. The base wall 57 closes the upper surface of each cavity 61. A lower surface side of each cavity 61 is open, and closed by the other-side dielectric 56 assembled with the one-side dielectric 55. The first inner conductor 13 is inserted into the cavity 61 from below in FIG. 7 (actually from above). A tapered guiding surface 62 for guiding the first inner conductor 13 is formed on the lower end of each side wall 58. Guiding surfaces 62 are also formed on the interpolar wall 59.

Figure 8:
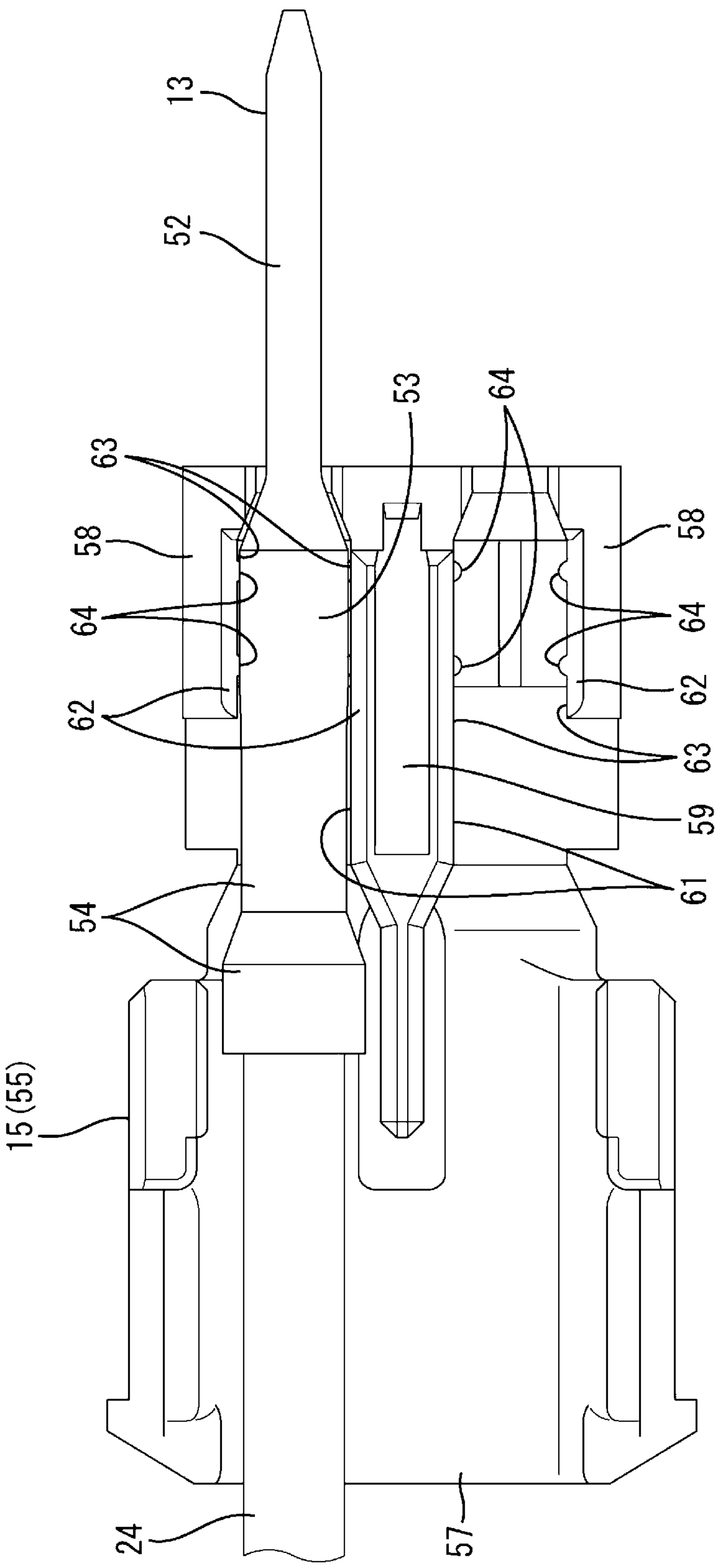
FIG. 8 is a bottom view showing a state where a first inner conductor is inserted in a cavity of the one-side dielectric.

As shown in FIG. 8, a front part of the interpolar wall 59 is formed thicker in the width direction than a rear part. The one-side dielectric 55 includes a plurality of press-fit projections 64 on facing surfaces 63 of the front part of the interpolar wall 59 and the side walls 58. The respective press-fit projections 64 project into the cavities 61 at the same positions in the front-rear direction on the respective facing surface 63, and a pair of the press-fit projections 64 are arranged at an interval in the front-rear direction on each facing surface 63. Specifically, each press-fit projection 64 is in the form of a rib extending in the vertical direction and formed to have an arcuate cross-section. A distance between tops of the respective press-fit projections 64 facing each other in the width direction is set slightly shorter than a width of the terminal body 53 of the first inner conductor 13. The upper end of each press-fit projection 64 is coupled to the base wall 57. The lower end of each press-fit projection 64 is continuous with the guiding surface 62 and tapered on each side wall 58. Note that the second dielectric 19 is not provided with parts equivalent to the press-fit projections 64.

Figure 9:
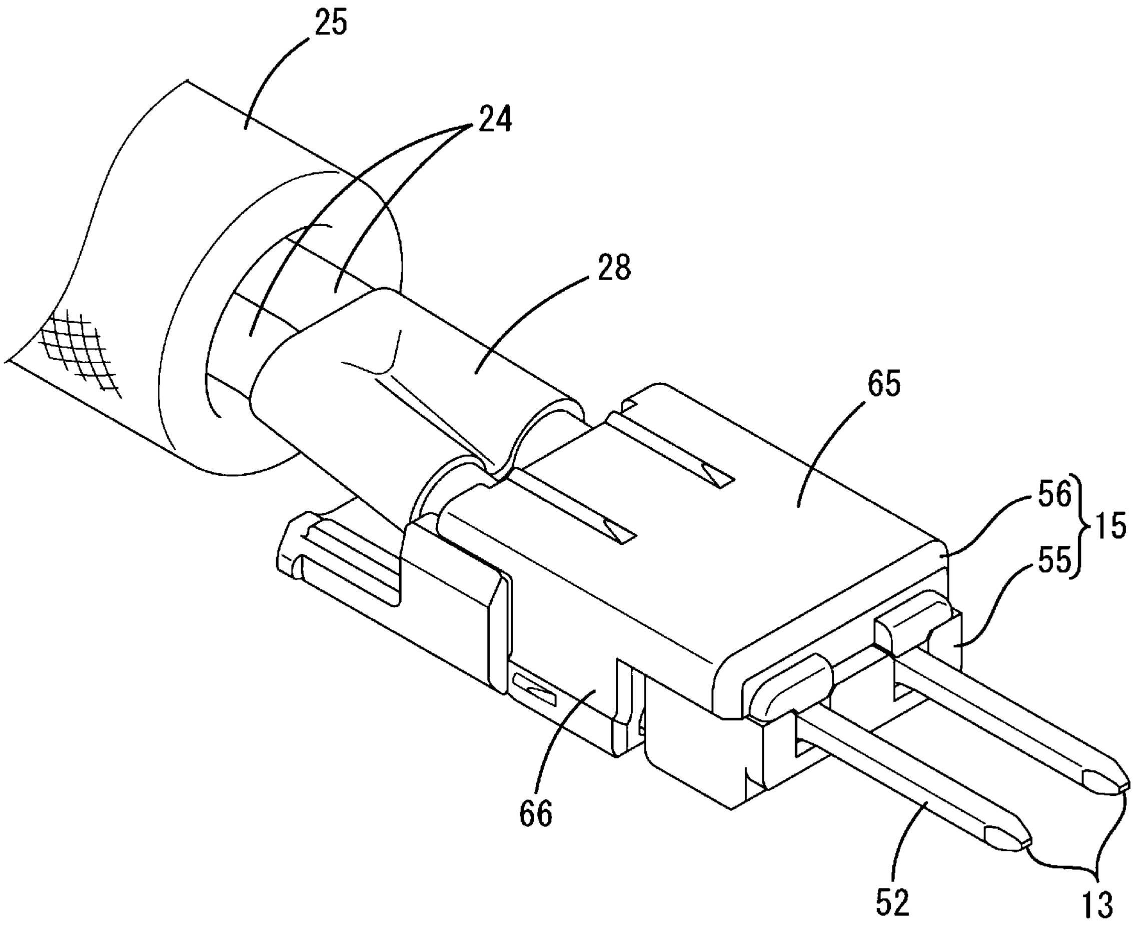
FIG. 9 is a perspective view showing a state where the first inner conductor is accommodated in a first dielectric.

As shown in FIGS. 2 and 9, the other-side dielectric 56 includes a covering wall 65 for closing an opening in the lower surface of the one-side dielectric 55 and a pair of lock walls 66 projecting upward from both widthwise ends of the covering wall 65. Each lock wall 66 is resiliently deformable, locked to the one-side dielectric 55 and holds the one-side dielectric 55 and the other-side dielectric 56 in the united state.

<First Outer Conductor>

Figure 6:
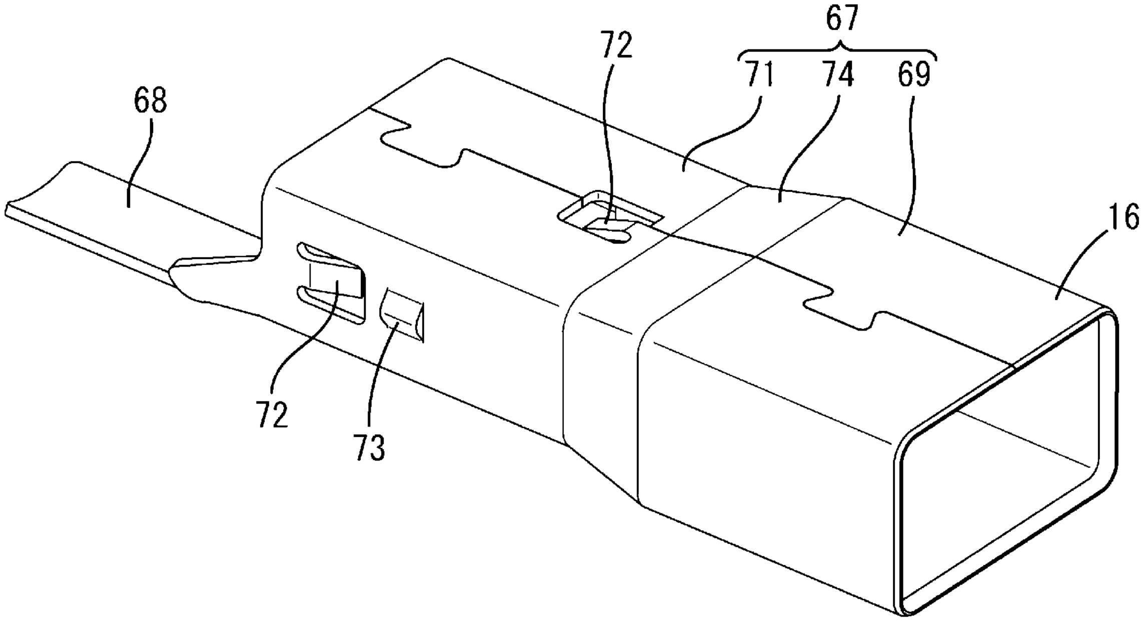
FIG. 6 is a perspective view of the first outer conductor.

The first outer conductor 16 is formed, such as by bending an electrically conductive metal plate. As shown in FIG. 6, the first outer conductor 16 includes a body tube portion 67 in the form of a rectangular tube long in the front-rear direction and a first shield connecting portion 68 to be connected to the shield body 25 of the cable 23.

A front part of the body tube portion 67 serves as a first outer conductor connecting portion 69 having large dimensions, and the second outer conductor connecting portion 34 is arranged inside the first outer conductor connecting portion 69. The resilient contact portions 35 of the second outer conductor connecting portion 34 conductively contact the inner surface of the first outer conductor connecting portion 69.

A rear part of the body tube portion 67 serves as a first outer conductor body portion 71 having dimensions one size smaller than the first outer conductor connecting portion 69. Radial dimensions (height, width) of the first outer conductor body portion 71 are set equal to those of the second outer conductor body portion 36. The first dielectric 15 is inserted and accommodated into the first outer conductor body portion 71 from behind. The first inner conductors 13 are electrically insulated from the body tube portion 67 by the first dielectric 15. Further, the first outer conductor body portion 71 includes a first dielectric locking portion 72 for locking the first dielectric 15 and first cover locking portions 73 for locking the first outer conductor cover 17.

The body tube portion 67 includes a constricted portion 74 having dimensions gradually reduced from the rear end of the first outer conductor connecting portion 69 to the front end of the first outer conductor body portion 71 between the first outer conductor connecting portion 69 and the first outer conductor body portion 71. That is, the constricted portion 74 is formed into a tapered shape toward the rear. Radial dimensions of the first outer conductor body portion 71 are set based on an angle of inclination and a length of the constricted portion 74.

The first shield connecting portion 68 is in the form of a plate extending rearward from the lower edge of the rear end of the body tube portion 67. As shown in FIG. 1, the first shield connecting portion 68 is arranged below the shield body 25 and connected to the shield body 25 by receiving a crimping force of the first outer conductor cover 17.

<First Outer Conductor Cover>

As shown in FIG. 5, the first outer conductor cover 17 has the same shape and same size as the second outer conductor cover 17 and includes a ceiling plate portion 39, side plate portions 41 and a shield barrel portion 42. In the case of the first outer conductor cover 17, locking grooves 43 are locked to the first cover locking portions 73 of the first outer conductor 16 (see FIG. 10), and the housing locking projection 46 is locked to a later-described first locking lance 76 of the first housing 18. Then, as shown in FIG. 1, the shield barrel portion 42 is crimped and connected to the shield body 25 of the cable 23 while sandwiching the first shield connecting portion 68 therebetween.

In the case of this embodiment, the first outer conductor cover 17 and the second outer conductor cover 17 are used without being distinguished from each other and commonly used as one type of outer conductor covers between the first connector 10 and the second connector 11.

<First Housing>

The first housing 18 is made of synthetic resin and includes, as shown in FIG. 1, a first module accommodating portion 75 penetrating in the front-rear direction. The resiliently deformable first locking lance 76 is formed to project forward on the upper surface of the inner wall of a rear part of the first module accommodating portion 75. A first module 77 formed by assembling the first inner conductors 13, the first dielectric 15, the first outer conductor 16 and the first outer conductor cover 17 is accommodated into the first module accommodating portion 75. The first module 77 is locked by the first locking lance 76. As shown in FIGS. 1 and 2, a front part of the first housing 18 serves as a receptacle 78 having dimensions one size larger than a rear part. The second housing 22 is fit into the receptacle 78.

<Assembling Procedure and Connection Structure of Connector>

In assembling the first module 77, the first inner conductor 13 is accommodated into the cavity 61 of the one-side dielectric 55 as shown in FIG. 8. The first inner conductor 13 is lowered toward the base wall 57 along the respective press-fit projections 64 from an opening side (side forward of the plane of FIG. 8) of the cavity 61 while being guided by the guiding surfaces 62. In this way, the terminal body 53 of the first inner conductor 13 is inserted into the cavity 61. The tab 52 of the first inner conductor 13 is arranged to project forward of the one-side dielectric 55 without contacting the one-side dielectric 55. Thus, the scraping of the resin of the one-side dielectric 55 by the tab 52 can be avoided and the adhesion of resin pieces of the one-side dielectric 55 to the surface of the tab 52 can be hindered. The respective press-fit projections 64 contact both side surfaces of the terminal body 53. Top sides of the respective press-fit projections 64 are squeezed by the terminal body 53 of the first inner conductor 13. In this way, the terminal body 53 is held from both sides in the width direction by the respective press-fit projections 64 and the rattling of the first inner conductor 13 in the cavity 61 is suppressed.

In the case of this embodiment, since the first outer conductor cover 17 and the second outer conductor cavity 17 are commonly used, the first outer conductor cover 17 comes closer to the second outer conductor cover 17 than in conventional connectors in the connected state, and a sufficient front-rear length cannot be secured for the first dielectric 15. Thus, there is a concern that the first inner conductors 13 are not stably accommodated in the cavities 61, such as by being inclined. However, since the rattling of the first inner conductors 13 in the cavities 61 is suppressed by the respective press-fit projections 64, a state where the first inner conductors 13 are stably accommodated in the cavities 61 can be realized.

Thereafter, as shown in FIG. 9, the other-side dielectric 56 is put on and assembled with the one-side dielectric 55. In this way, the first inner conductors 13 are more stably held in the first dielectric 15. Subsequently, the first dielectric 15 is inserted into the first outer conductor 16 from behind. The first dielectric 15 is retained in the first outer conductor 16 by being locked by the first dielectric locking portion 72. At this time, the first dielectric 15 is arranged in the first outer conductor body portion 71 and the tabs 52 of the first inner conductors 13 are arranged to project into the first outer conductor connecting portion 69.

Figure 10:
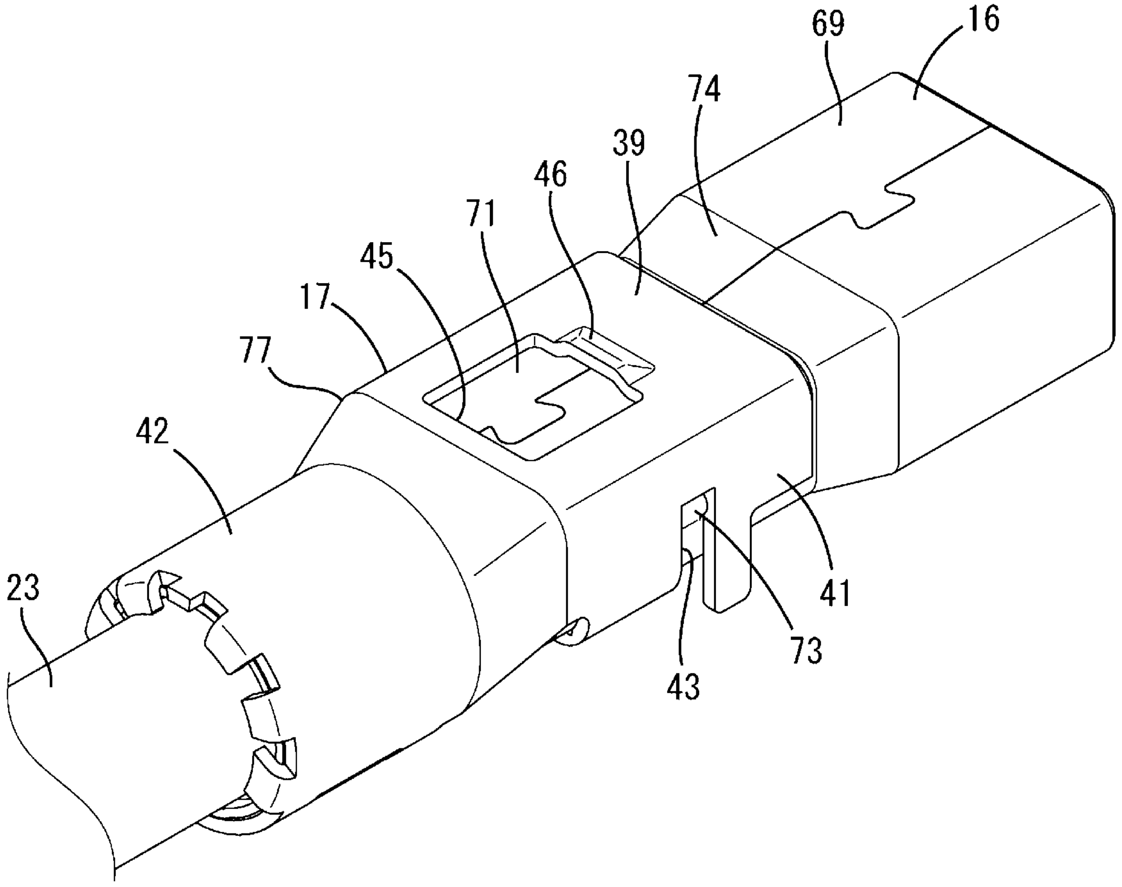
FIG. 10 is a perspective view of a first module.

Subsequently, the first outer conductor cover 17 is assembled with the first outer conductor body portion 71, and the shield barrel portion 42 is crimped and connected to the shield body 25 of the cable 23 together with the first shield connecting portion 68. In this way, the assembling of the first module 77 shown in FIG. 10 is completed. The first module 77 is inserted into the first module accommodating portion 75 of the first housing 18 from behind. The first module 77 is retained in the first module accommodating portion 75 of the first housing 18 by locking the first locking lance 76 to the housing locking projection 46 (see FIG. 1). The first outer conductor connecting portion 69 is arranged to project into the receptacle 78. In the above way, the assembling of the first connector 10 is completed. The second connector 11 is assembled in a procedure similar to that of the first connector 10.

The first connector 10 and the second connector 11 are connected from a state squarely facing each other. By locking the first housing 18 by the lock arm 51 of the second housing 22, the first connector 10 and the second connector 11 are held in the connected state. As shown in FIG. 1, in the connected state, the second outer conductor connecting portion 34 is fit inside the first outer conductor connecting portion 69 and the first and second outer conductor connecting portions 69, 34 are arranged to radially overlap each other. By the contact of the respective resilient contact portions 35 of the second outer conductor connecting portion 34 with the inner surface of the first outer conductor connecting portion 69, the first and second outer conductors 16, 21 are connected. In the case of this embodiment, since the first and second inner conductors 13, 14 are covered around without any gap by the first outer conductor 16, the first outer conductor cover 17, the second outer conductor 21 and the second outer conductor cover 17, the intrusion of noise from outside can be prevented and the leakage of noise to outside can be prevented. Therefore, shielding performance can be improved.

Further, in the case of this embodiment, the first and second outer conductor body portions 71, 36 have the same dimensions and, in the connected state, the outer surface of the first outer conductor body portion 71 and the outer surface of the second outer conductor body portion 36 are arranged to constitute a virtual tube continuous in the front-rear direction while having the same dimensions. Thus, an impedance disturbance can be suppressed and impedance matching can be achieved between the first connector 10 and the second connector 11.

As described above, according to this embodiment, the first and second outer conductor body portions 71, 36 can be set to have the same dimensions by arranging the constricted portion 74 between the first outer conductor connecting portion 69 and the first outer conductor body portion 71. Thus, the first outer conductor cover 17 and the second outer conductor cover 17 can be easily set to have the same shape.

Further, even if a sufficient front-rear length cannot be secured for the first dielectric 15, the first inner conductors 13 can be stably accommodated in the cavities 61 since the one-side dielectric 55 is formed with the plurality of press-fit projections 64 for contacting the terminal bodies 53 of the first inner conductors 13.

The respective press-fit projections 64 can be satisfactorily brought into contact with the terminal body 53 of the first inner conductor 13 by lowering the first inner conductor 13 toward the base wall 57 from the opening side and inserting the terminal body 53 into the cavity 61. Further, the tab 52 of the first inner conductor 13 is arranged outside the first dielectric 15 and cannot contact the first dielectric 15 in the process of insertion into the cavity 61. Therefore, the adhesion of the resin of the first dielectric 15 to the tab 52 can be avoided and the connection reliability of the tab 52 to the second inner conductor 14 can be ensured.

OTHER EMBODIMENTS OF THE PRESENT DISCLOSURE

The embodiment disclosed this time should be considered illustrative in all aspects, rather than restrictive.

As another embodiment, the first and second outer conductor body portions need not be set to precisely have the same dimensions and the radial dimensions thereof may be different from each other within a range in which the first and second outer conductor covers can be commonly used.

As another embodiment, the press-fit projections may be provided in the second dielectric in addition to the first dielectric.

As another embodiment, the first connector may be a female connector including female terminal(s) as first inner conductor(s).

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A connector, comprising a first connector and a second connector connectable to each other, wherein:

the first connector includes a first inner conductor, a first outer conductor for covering an outer periphery of the first inner conductor, a first outer conductor cover for covering an outer periphery of the first outer conductor and a first dielectric arranged between the first inner conductor and the first outer conductor, the second connector includes a second inner conductor, a second outer conductor for covering an outer periphery of the second inner conductor, a second outer conductor cover for covering an outer periphery of the second outer conductor and a second dielectric arranged between the second inner conductor and the second outer conductor, the second outer conductor includes a second outer conductor body portion arranged between the second dielectric and the second outer conductor cover and a second outer conductor connecting portion overlapping the first outer conductor in a radial direction, the first outer conductor includes a first outer conductor body portion arranged between the first dielectric and the first outer conductor cover, a first outer conductor connecting portion for covering the outer periphery of the second outer conductor connecting portion and contacting the second outer conductor connecting portion, and a constricted portion reduced in dimensions from the first outer conductor connecting portion to the first outer conductor body portion, the first outer conductor cover and the second outer conductor cover have a same shape, the first dielectric includes a one-side dielectric and an other-side dielectric unitable with each other, the one-side dielectric includes a base wall, facing surfaces intersecting the base wall and facing each other, and a cavity formed between the facing surfaces facing each other to accommodate the first inner conductor, the other-side dielectric closes an opening side facing the base wall, and press-fit projections to be brought into contact with the first inner conductor are formed on the facing surfaces of the one-side dielectric.

2. The connector of claim 1, wherein the press-fit projections are in the form of ribs linearly extending from the opening side toward the base wall on the facing surfaces.

3. The connector of claim 2, wherein the first inner conductor is a male terminal and includes a terminal body in the form of a rectangular tube to be accommodated into the cavity and a tab projecting from the terminal body and to be arranged outside the one-side dielectric.

* * * * *